US012467591B2

(12) United States Patent
Boucher

(10) Patent No.: US 12,467,591 B2
(45) Date of Patent: Nov. 11, 2025

(54) LOW-PROFILE INSPECTION DEVICES

(71) Applicant: Ronald Vincent Boucher, Bristol, CT (US)

(72) Inventor: Ronald Vincent Boucher, Bristol, CT (US)

( * ) Notice: Subject to any disclaimer, the term of this patent is extended or adjusted under 35 U.S.C. 154(b) by 0 days.

(21) Appl. No.: 18/765,900

(22) Filed: Jul. 8, 2024

(65) Prior Publication Data

US 2025/0012412 A1 Jan. 9, 2025

Related U.S. Application Data

(60) Provisional application No. 63/525,448, filed on Jul. 7, 2023.

(51) Int. Cl.

*F21L 4/04* (2006.01)
*B25H 5/00* (2006.01)
*F21V 21/30* (2006.01)
*F21V 23/00* (2015.01)
*F21V 23/06* (2006.01)

(Continued)

(52) U.S. Cl.

CPC .................. *F21L 4/04* (2013.01); *B25H 5/00* (2013.01); *F21V 21/30* (2013.01); *F21V 23/002* (2013.01); *F21V 23/06* (2013.01); *F21W 2131/402* (2013.01); *F21Y 2115/10* (2016.08)

(58) Field of Classification Search

CPC ........... F21W 2131/402; F21Y 2115/10; F21V 21/30; F21L 4/04; B25H 5/00

See application file for complete search history.

(56) References Cited

U.S. PATENT DOCUMENTS 7,032,907 B1 * 4/2006 Marsh ........................ B25H 5/00 280/32.6
7,434,817 B2 * 10/2008 Rush ........................ B25H 5/00 280/32.6
9,126,326 B1 * 9/2015 Bowen ...................... B25H 5/00

(Continued)

FOREIGN PATENT DOCUMENTS

CA 2666986 A1 * 11/2009 ............... B25H 5/00

OTHER PUBLICATIONS

Innovation q+ npl search (Year: 2024).*

*Primary Examiner* — Anabel Ton
(74) *Attorney, Agent, or Firm* — Farber LLC

(57) ABSTRACT

Maintenance and inspection devices, such as creepers, are provided that comprise a frame for supporting an individual and configured for coupling to one or more wheels. The device comprises or more light sources coupled to the frame and a power source housed within, or on, the frame. One or more electrical connectors extend through the frame to couple the light sources with the power source. Routing the electrical connectors through the frame of the inspection device protects the electrical connectors from wear or damage and inhibits removal of the light sources. The light sources may be pivotally coupled to the frame to allow the operator to adjust the angle of the light. The device may further comprise an actuator device for moving the frame between a substantially horizontal configuration relative to the ground surface and a substantially vertical or upright configuration. This allows the operator to direct the light in a more horizontal direction and/or easily store the inspection device after use.

12 Claims, 4 Drawing Sheets

(51) Int. Cl.
*F21W 131/402* (2006.01)
*F21Y 115/10* (2016.01)

(56) References Cited

U.S. PATENT DOCUMENTS

| | | | | |
|---|---|---|---|---|
| 9,623,551 | B1 * | 4/2017 | Bowen | B25H 5/00 |
| 10,328,570 | B1 * | 6/2019 | O'Donnell | B25H 5/00 |
| 11,628,555 | B1 * | 4/2023 | Williams | B25H 5/00 280/32.6 |
| 11,969,875 | B1 * | 4/2024 | Gess | F21V 33/00 |
| 2002/0109991 | A1 * | 8/2002 | Alsup | F21V 33/0084 362/225 |
| 2004/0100048 | A1 * | 5/2004 | Deasy | B25H 5/00 280/32.6 |
| 2004/0100049 | A1 * | 5/2004 | Deasy | B25H 5/00 280/32.6 |
| 2011/0227303 | A1 * | 9/2011 | Gering | B25H 5/00 362/183 |
| 2017/0368677 | A1 * | 12/2017 | Rotenberg | F21V 21/08 |

* cited by examiner

LOW-PROFILE INSPECTION DEVICES

CROSS-REFERENCE TO RELATED APPLICATIONS

This application claims the benefit of U.S. Provisional Application Ser. No. 63/525,448, filed Jul. 7, 2023, the complete disclosure of which is incorporated herein by reference for all purposes.

TECHNICAL FIELD

This description generally relates to devices for performing inspections or maintenance in confined spaces, such as the underside of a vehicle.

BACKGROUND

Creepers are low-profile devices used by many mechanics and other operators to access areas underneath vehicles, often between tires, for performing inspection or maintenance. Creepers usually comprise a wheeled platform constructed of a stiff frame and wheels that allows the mechanic to roll under the vehicle on his/her back to inspect and/or perform maintenance on the vehicle.

The work areas underneath vehicles, however, are often dark as a result of the vehicle obscuring light, which makes it difficult for the operator to see what they are doing. Many mechanics will hold lights either in their mouth, place them on their chest or stand them up on the floor. However, as the mechanic moves to different places, the light may also need to move. Further, lights, tools and parts being placed on the mechanic's chest often roll off onto the ground, thus adding unnecessary time and effort to the mechanic's labor to find those items.

Thus, it would be desirable to provide improved devices for performing inspections or maintenance in confined spaces, such as creepers.

SUMMARY

Devices and methods for performing inspections or maintenance in confined spaces, such as the underside of a vehicle, are provided. The devices are designed to be self-contained and include light sources, connectors and a power supply coupled to the frame. The devices may further include additional storage space for storing tools, parts or other accessories and adjustable features for storing the frame after use.

In one aspect, an inspection device comprises a frame, one or more light sources coupled to the frame, a power source housed within, or on, the frame and one or more electrical connectors enclosed within the frame and coupling the light sources with the power source.

In embodiments, the electrical connectors are embedded within the frame. Routing the electrical connectors through the frame of the inspection device protects the electrical connectors from wear or damage and inhibits the removal of the light sources from the device.

The light sources may be removably coupled to the frame, or they may be permanently attached to the electrical connectors. In embodiments, the light sources are pivotally coupled to the frame to allow the operator to adjust the angle of the light. In an exemplary embodiment, the light sources are rotatable relative to the frame about at least first and second axes. In one such embodiment, the first and second axes are substantially perpendicular to each other.

In embodiments, the light sources extend outward from the frame. In an exemplary embodiment, the light sources extend outward from a wall of the frame adjacent to, or near, the head region of the frame such that the operator's field of vision is illuminated by the light sources.

The light sources may comprise any suitable source of light, such as incandescent, fluorescent, high-intensity discharge, low-pressure sodium, light emitting diodes (LEDs) or the like. In an exemplary embodiment, the light sources each comprise an array of LEDs.

In embodiments, the frame comprises a relatively stiff platform configured for supporting a human being. The platform may comprise any suitable rigid material, such as plastic, metal and the like. The platform may include an upper surface and a lower surface opposite the upper surface. The upper surface may be contoured to provide an ergonomic surface for the operator. The upper surface may be tapered inwards towards the center of the platform. The upper surface may comprise one or more cutouts or recesses to provide room for the operator's arms, shoulders, knees, hips or the like.

In embodiments, the platform comprises a recess in one of the upper or lower surfaces. The power source comprise a battery disposed within the recess. The battery may be rechargeable.

In embodiments, the device comprises one or more additional recesses in the upper surface of the platform. The additional recesses may be used, for example, for holding tools or parts required for a particular job. This allows the operator to have the tools/parts close at hand and easy to access during the job.

In another aspect, an inspection device comprises a frame, one or more light sources coupled to the frame, and an actuator device for adjusting an angle of the frame relative to a ground surface. In embodiments, the actuator device is configured to adjust the frame from a substantially horizontal configuration relative to the ground surface to a substantially vertical or upright configuration. This allows the operator to provide horizontal illumination to a work area and/or easily store the inspection device after use (e.g. against a wall or other upright surface).

In embodiments, the actuator device comprises a rod, pole, shaft or the like, pivotally coupled to the frame. The rod may comprise a first end coupled to the frame and a second end configured to rotate towards and away from the frame. The rod may have a telescoping portion that extends the length of the rod. The second end may comprise a traction element, such as bumper, cushion, foot or the like, that provides sufficient resistance to a ground surface to allow the inspection device to remain in the upright configuration.

In embodiments, the frame comprises a platform having an upper surface, a lower surface opposite the upper surface and an opening or slot extending through one of the upper or lower surfaces. The rod may be positionable within the slot in the horizontal configuration during use. The rod may be pivoted outwards from the slot to move the device into the upright configuration.

In another aspect, an attachment apparatus for an inspection device having one or more wheels is provided. The attachment apparatus comprises a frame having one or more support areas configured for coupled to the one or more wheels of the inspection device. The apparatus further comprises one or more light sources coupled to the frame, a power source housed within, or on, the frame, and one or more electrical connectors within the frame coupling the light sources to the power source.

BRIEF DESCRIPTION OF THE DRAWINGS

The accompanying drawings, which are incorporated in and constitute a part of this specification, illustrate several embodiments of the disclosure and together with the description, explain the principles of the disclosure.

DESCRIPTION OF THE EMBODIMENTS

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Maintenance and inspection devices are provided that comprise a frame for supporting an individual and configured for coupling to one or more wheels. The devices are designed to be self-contained and include light sources, connectors and a power supply coupled to the frame. The devices further include additional storage space for storing tools, parts or other accessories and adjustable features for storing the frame after use.

Figure 1:
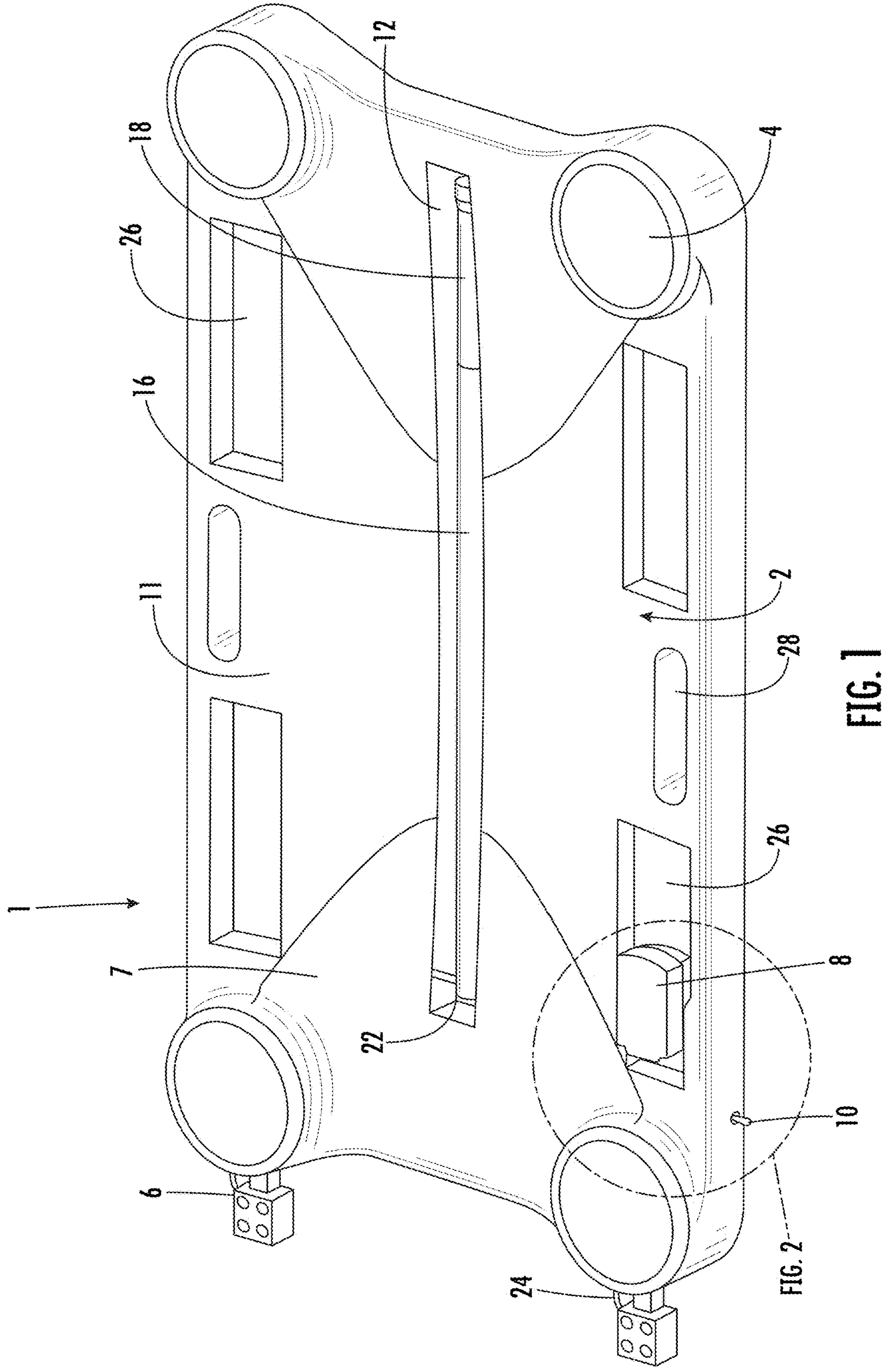
FIG. 1 is a perspective view of a lighted device for use with a creeper.
Figure 2:
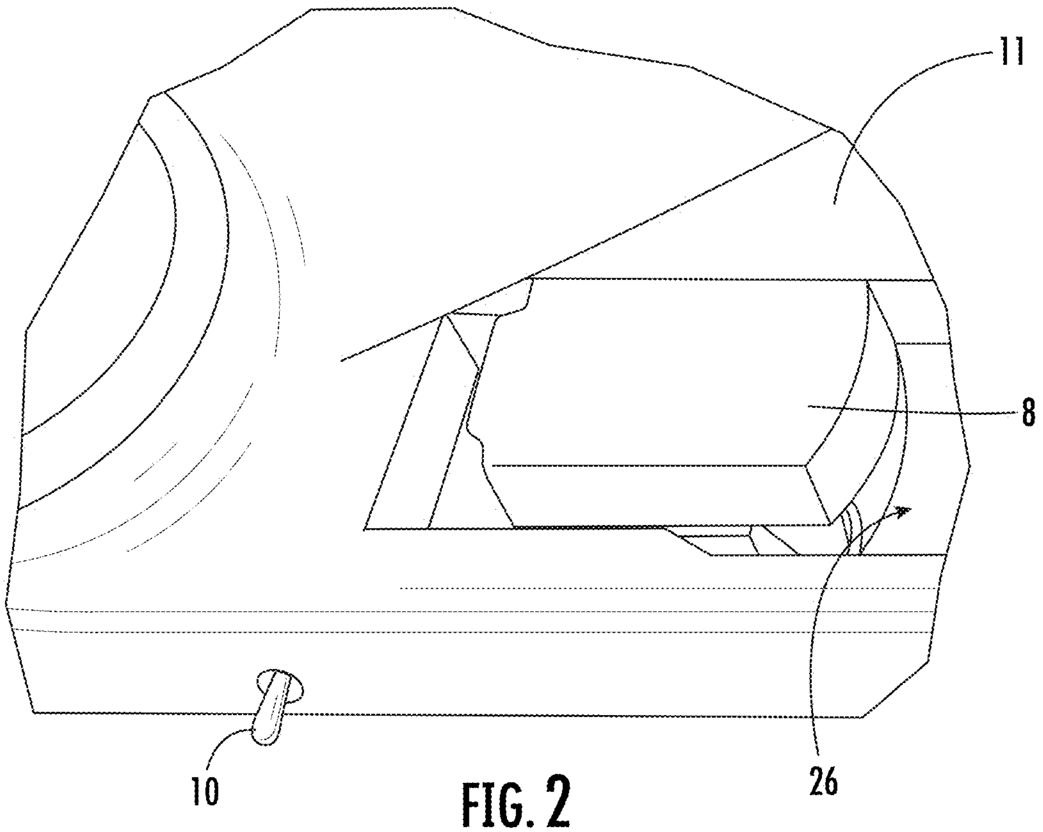
FIG. 2 is an enlarged view of a battery for the lighted device of FIG. 1.
Figure 3:
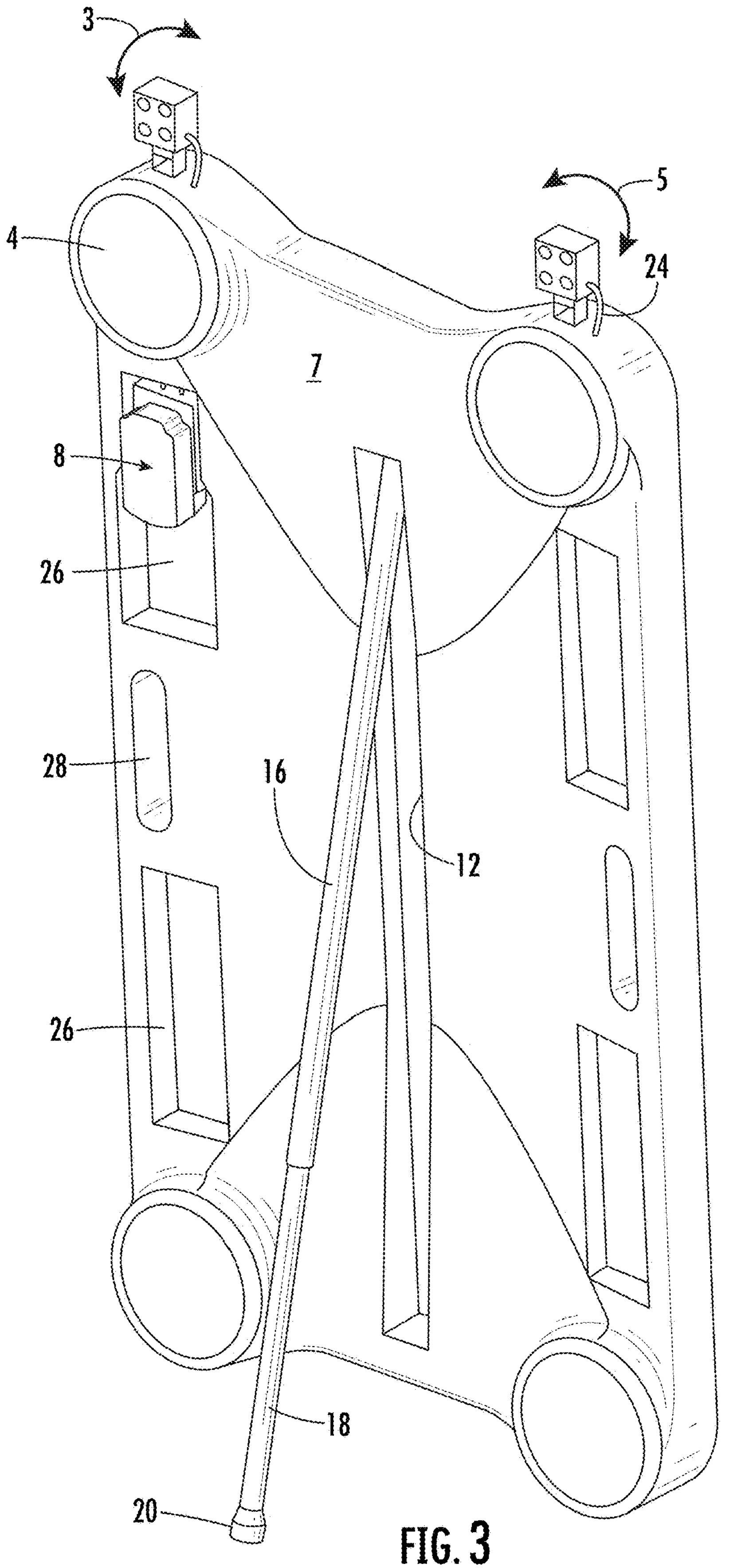
FIG. 3 illustrates the lighted device in an upright position.

Referring now to FIGS. 1-3, a low-profile inspection device 1, such as a creeper, a mechanics creeper, a car creeper, a garage creeper or the like, is illustrated. Device 1 comprises a frame 2 having an upper surface 11 and a lower surface (not shown). Frame 2 comprises a suitably rigid and stiff platform configured for supporting a human being. The platform may comprise any suitable rigid material, such as heavy-duty plastic, such as polyvinyl chloride (PVC), polypropylene (PP) or vinyl, metal, such as steel, and the like. The platform may have a coating, such as a powder coating, to protect it from rust, scratches and chips. Frame 2 may have any suitable shape, such as rectangular, square, circular or the like. In an exemplary embodiment, frame 2 is substantially rectangular and has a length of at least about six feet and a width of about 3 feet to about 5 feet.

Device 1 may further include a padded backrest, such as foam padding, vinyl or other durable materials (not shown) on upper surface to provide comfort and supply to a mechanic while lying down on frame 2. Frame 2 may further include adjustable features to accommodate different body sizes and working preferences, such as backrest, height-adjustment mechanisms or other features that allow users to customer the device to their specific needs. The frame 2 may comprise raised sides that allow the operator to hold on to either side while moving to different places. In some embodiments, frame 2 is foldable to, for example, allow the creeper to switch to a seat.

Upper surface 11 may be contoured such that the outer portions of surface tapers downwards towards the center of frame 2. In one embodiment, frame 2 is constructed of a suitably stiff and rigid material that will support the operator, i.e., in a supine position with his/her head resting on a support area 7 of frame. Support area 7 may be raised up from the rest of upper surface to provide further support for the operator's head. Alternatively, support area 7 may comprise a separate component, such as a head rest or pillow (not shown) coupled to, or integral with, frame 2 that rises above frame 2 and provides support to the operator's head. The head rest may be adjustable. In certain embodiments, support area 7 may be removably coupled to frame 2 so that the operator may position support area 7 on any portion of frame 2.

Figure 4:
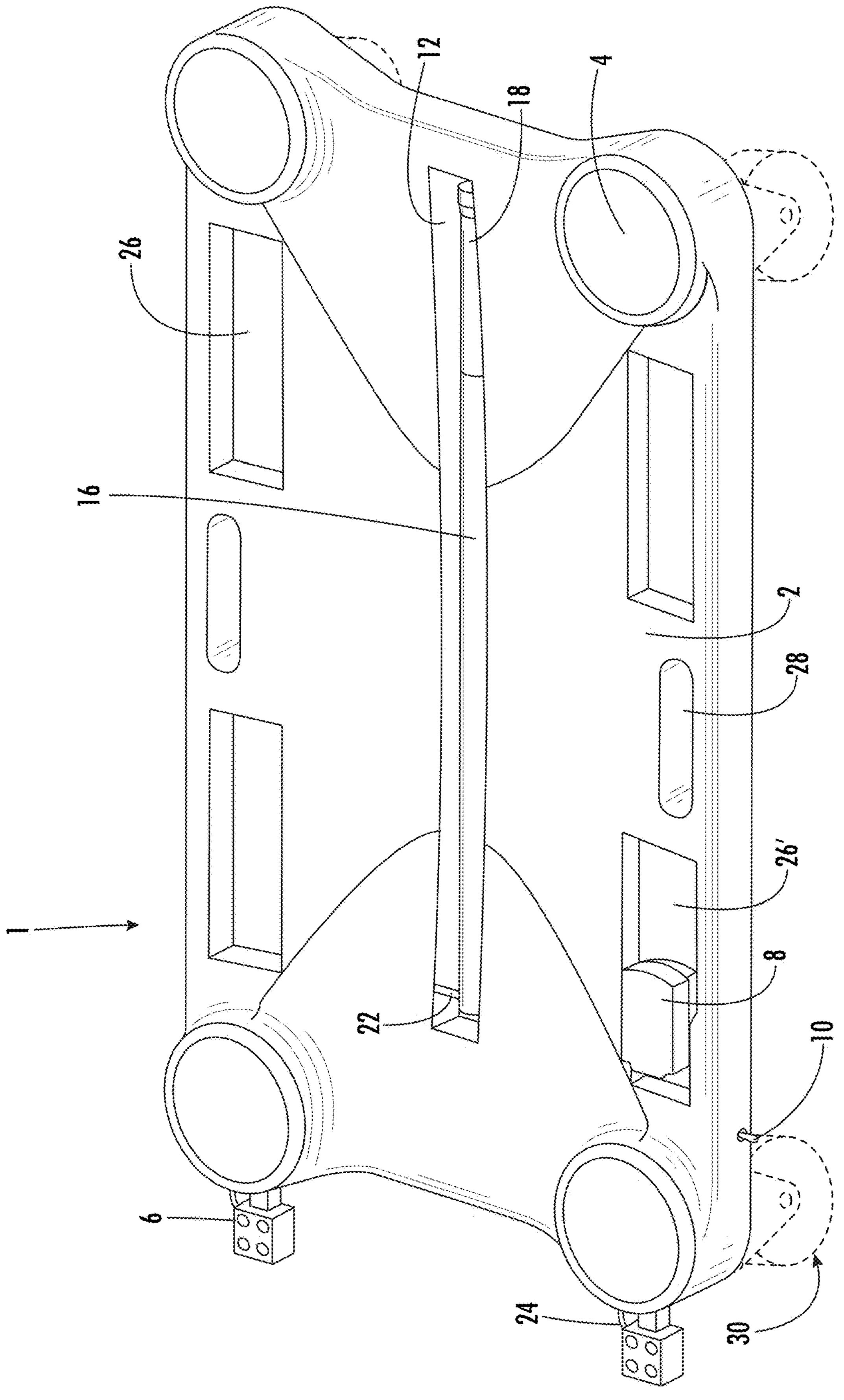
FIG. 4 is a perspective view of the lighted device attached to a creeper

Frame 2 further comprises four wheel support regions 4 preferably positioned near the corners of frame 2. Wheel support regions 4 are designed to provide support for wheels 30 that may be attached to frame 2 on the lower surface of the frame (see FIG. 4) to allow the operator to roll effortlessly under a vehicle. Support regions 4 may include an attachment or mating feature on the lower surface for coupling with the wheel, which may comprise any suitable wheel made of a durable material, such as rubber or the like. Alternatively, the wheels may be permanently mounted to frame 2. In one embodiment, the wheels comprise a caster wheel. In other embodiments, the wheels may comprise extra wide tires for maneuvering over rough surfaces, such as gravel, grass, broken concrete, sand or obstacles.

Device 1 further comprises one or more lights 6 coupled to upper surface or side surface of frame 2. Lights 6 are preferably spaced from each other and may be positioned on one or more of the corners of frame 2, or along one or more of the sides of frame. Device 1 may comprise one light, two lights, three lights, or four or more lights. In one embodiment, device 1 comprises two lights 6 extending from a front surface of frame 2 on either side of support area 7 such that the operator's field of vision is illuminated by lights 6. Lights 6 may comprise any suitable lighting device, such as incandescent, fluorescent, high-intensity discharge, low-pressure sodium, light emitting diodes (LEDs) or the like. In one embodiment, lights 6 each comprise an array of LEDs and may further include one or more lenses or other transparent material designed to focus projection of the light emitted by the light source.

Lights 6 may be coupled to frame 2 in any suitable manner. In one embodiment, lights 6 are rotatably coupled to frame 2 around at least one axis. In an exemplary embodiment, lights are rotatably coupled around two axes such that lights may rotate relative to frame 2 in the directions shown by arrows 3, 5 in FIG. 3. For example, lights 6 may be rotatable relative to frame 2 about a first axis (see arrow 3), and they may be rotatable relative to frame 2 about a second axis (see arrow 5), wherein the second axis is substantially perpendicular to the first axis. This allows the operator to orient the lights to provide optimal illumination of the work area above device 1. Preferably the lights 6 are securely attached in a permanent way to the creeper, for example using screw type fasteners, rivets or other secure fasteners such that the lights 6 are designed not to be removable.

Device 1 further comprises a power source, such as a battery 8, and a user interface 10, such as a switch, knob, button or the like, for turning battery 8 ON/OFF. Battery 8 is preferably removable coupled to frame 2 within a recess 26. Recess 26 may be disposed on either the upper or lower surfaces of frame 2. Battery 8 may comprise any suitable battery for operating lights 6, such as a power tool battery, alkaline, a lithium-ion, nickel cadmium, nickel metal hydride, M12 batteries (i.e., Milwaukee batteries) or the like. In one embodiment, battery 8 is rechargeable and may be switched out with other interchangeable batteries.

Frame 2 further comprises electrical connectors, such as wiring 24, extending from lights 6 to battery 8 within recess 26. Wiring 24 preferably extends through one or more internal channels or lumens (not shown) within frame 2 to recess 26 such that wiring 24 is completely enclosed or embedded within frame 2. Wiring 24 is routed in through the body of the creeper and underneath the creeper and thus even if the light fasteners were removed, the wiring would prevent removal of the lights from the creeper body.

Frame 2 may include one recess 26, or two recesses, or three or more recesses 26. In one embodiment, frame 2 comprises four recesses positioned one the sides of frame 26. One of the recesses 26 is configured for battery 26 and the other recesses 26 may be configured to hold components, such as tools, parts or other accessories required for a particular job. This allows the operator to have the tools/parts close at hand and easy to access during the job (i.e., rather than placing them in pockets or on the mechanic's chest where they could potentially fall off and onto the ground).

In certain embodiments, device 1 further comprises a central recess or slot 12 extending along a portion of the center of frame 2. Device 1 may further comprise an adjustable pole 16 that includes a pivot or hinge 22 that pivotally couples pole 16 to frame 2. Pole 16 may be configured to rotate about pivot 22 to move in and out of slot 12. Pole 16 may comprise a telescoping portion 18 configured to move longitudinally relative to pole 16 to adjust a length of pole 16. Pole 16 further comprises a traction element 20, such as bumper, cushion, foot or the like, that provides sufficient resistance to a ground surface to allow the inspection device to remain in the upright configuration. Traction element 20 may comprise any material having a relatively high friction coefficient, such as rubber or the like.

As shown in FIG. 3, the angle of device 1 relative to the ground or floor may be adjusted by pivoting pole 16 about pivot 22, extending telescope 18 and placing foot 20 on the ground or floor. For example, device 1 may be positioned in a substantially upright configuration to direct light in a more horizontal direction. Alternatively, the upright configuration may be used to store device 1 when not in use.

Device 1 further comprises one or more handle(s) 28 within frame 2 to allow the operator to grasp handle(s) 28 to pick up and move device 2, or to hang it in storage. In one embodiment, handles 28 are positioned in the central portion of the long side of device 2.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

For example, the description contains at least the following embodiments:

An inspection device comprising: a frame; one or more light sources coupled to the frame; a power source housed within, or on, the frame; and one or more electrical connectors enclosed within the frame and coupling the one or more light sources with the power source.

The inspection device, wherein the electrical connectors are embedded within the frame.

The inspection device, wherein the one or more light sources are rotatable relative to the frame about first and second axes and wherein the first axis is perpendicular to the second axis.

The inspection device, wherein the one or more light sources are pivotally coupled to the frame.

The inspection device of, wherein the one or more light sources comprises light emitting diodes (LEDs).

The inspection device, wherein the platform comprises an upper surface and a lower surface opposite the upper surface, wherein the electrical connectors extend from the one or more light sources to the power source between the upper and lower surfaces.

The inspection device, wherein the platform further comprises a recess in one of the upper or lower surfaces, wherein the power source comprises a battery disposed within the recess.

The inspection device, further comprising a second recess in the upper surface of the platform.

The inspection device, wherein the platform comprises first and second side walls and first and second end walls, wherein the upper surface tapers inwardly from the first end wall towards a central portion of the upper surface.

The inspection device, wherein the upper surface tapers inwardly from the second end wall towards the central portion of the upper surface.

The inspection device wherein the one or more light sources extend outward from the first end wall of the platform.

The inspection device, wherein the frame further comprises one or more support areas configured for coupling to one or more wheels.

The inspection device, further comprising one or more wheels coupled to the frame.

The inspection device, further comprising a rod pivotally coupled to the frame.

The inspection device, wherein the rod comprises a first end pivotally coupled to the frame and a second end configured to rotate towards and away from the frame.

The inspection device, wherein the second end comprises a support for resting the second end on the ground.

The inspection device, wherein the rod comprises a first portion and a second portion, wherein the second portion is configured to telescope relative to the first portion to adjust a length of the rod.

An inspection device comprising: a frame; one or more light sources coupled to the frame; and an actuator for moving the frame between a substantially horizontal configuration relative to the ground surface and a substantially vertical configuration relative to the ground surface.

The inspection device, wherein the actuator comprises a rod pivotally coupled to the frame.

The inspection device, wherein the rod comprises a first end pivotally coupled to the frame and a second end configured to rotate towards and away from the frame.

The inspection device, wherein the second end comprises a traction element for resting the second end on the ground.

The inspection device, wherein the rod comprises a first portion and a second portion, wherein the second portion is configured to telescope relative to the first portion to adjust a length of the rod.

The inspection device, wherein the frame is a platform configured for supporting a human being.

The inspection device, wherein the platform comprises an upper surface, a lower surface opposite the upper surface and a slot extending through the upper surface.

The inspection device, wherein the rod is positionable within the slot. The inspection device, wherein the platform further comprises one or more support areas configured for coupling to one or more wheels, wherein the one or more support areas are disposed on the lower surface of the platform.

The inspection device, further comprising one or more wheels coupled to the frame.

The inspection device, further comprising: a power source housing within, or on, the frame; and one or more electrical connectors within the frame coupling the one or more light sources with the power source.

The inspection device, wherein the electrical connectors are embedded within the frame.

The inspection device, wherein the one or more light sources are pivotally coupled to the frame.

The inspection device, wherein the one or more light sources are rotatable relative to the frame about first and second axes, the first axis perpendicular to the second axis.

The inspection device, wherein the one or more light sources comprises light emitting diodes (LEDs).

The inspection device, wherein the platform further comprises a recess in one of the upper or lower surfaces and wherein the power source comprises a battery disposed within the recess.

The inspection device, further comprising a second recess in the upper surface of the platform.

An attachment apparatus for an inspection device having one or more wheels, the apparatus comprising: a frame comprising one or more support areas configured for coupling to the one or more wheels of the inspection device; one or more light sources coupled to the frame; a power source housing within, or on, the frame; and one or more electrical connectors enclosed within the frame coupling the one or more light sources with the power source.

The apparatus, wherein the electrical connectors are embedded within the frame.

The apparatus, wherein the one or more light sources are pivotally coupled to the frame.

The apparatus, wherein the one or more light sources are rotatable relative to the frame about first and second axes, the first axis perpendicular to the second axis.

The apparatus, further comprising a rod pivotally coupled to the frame. The apparatus, wherein the rod comprises a first end pivotally coupled to the frame and a second end configured to rotate towards and away from the frame.

The apparatus, wherein the second end comprises a support for resting the second end on the ground.

The apparatus, wherein the rod comprises a first portion and a second portion, wherein the second portion is configured to telescope relative to the first portion to adjust a length of the rod.

The invention claimed is:

1. An inspection device comprising:

a frame, wherein the frame is a platform configured for supporting a human being and wherein the platform comprises first and second side walls, first and second end walls and an upper surface, wherein the upper surface tapers inwardly from the first end wall towards a central portion of the upper surface;

one or more light sources coupled to the frame;

a power source housed within, or on, the frame; and one or more electrical connectors enclosed within the frame and coupling the one or more light sources with the power source.

2. The inspection device of claim 1, wherein the electrical connectors are embedded within the frame.

3. The inspection device of claim 1, wherein the one or more light sources are pivotally coupled to the frame.

4. The inspection device of claim 1, wherein the one or more light sources are rotatable relative to the frame about first and second axes and wherein the first axis is perpendicular to the second axis.

5. The inspection device of claim 1, wherein the one or more light sources comprises light emitting diodes (LEDs).

6. The inspection device of claim 1, wherein the platform comprises an upper surface and a lower surface opposite the upper surface, wherein the electrical connectors extend from the one or more light sources to the power source between the upper and lower surfaces.

7. The inspection device of claim 6, wherein the platform further comprises a recess in one of the upper or lower surfaces, wherein the power source comprises a battery disposed within the recess.

8. The inspection device of claim 7, further comprising a second recess in the upper surface of the platform.

9. The inspection device of claim 1, wherein the upper surface tapers inwardly from the second end wall towards the central portion of the upper surface.

10. The inspection device of claim 1, wherein the one or more light sources extend outward from the first end wall of the platform.

11. The inspection device of claim 1, wherein the frame further comprises one or more support areas configured for coupling to one or more wheels.

12. The inspection device of claim 1, further comprising one or more wheels coupled to the frame.

* * * * *